Nov. 6, 1956   P. J. PACKMAN   2,769,539
SEPARATING APPARATUS
Filed Nov. 17, 1952   6 Sheets-Sheet 1

INVENTOR
Percival J. Packman
By Watson, Cole, Grindle &
Watson
ATTORNEYS

Nov. 6, 1956   P. J. PACKMAN   2,769,539
SEPARATING APPARATUS

Filed Nov. 17, 1952   6 Sheets-Sheet 2

INVENTOR
Percival J. Packman
By Watson, Cole, Grindle &
Watson   ATTORNEYS

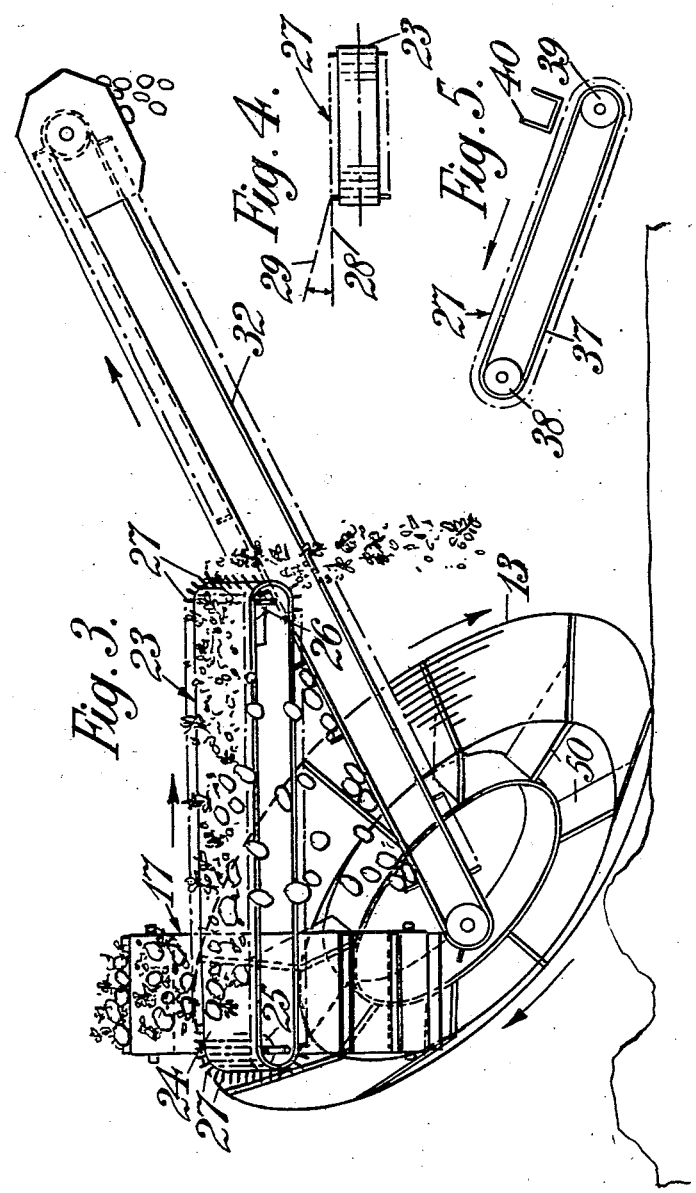

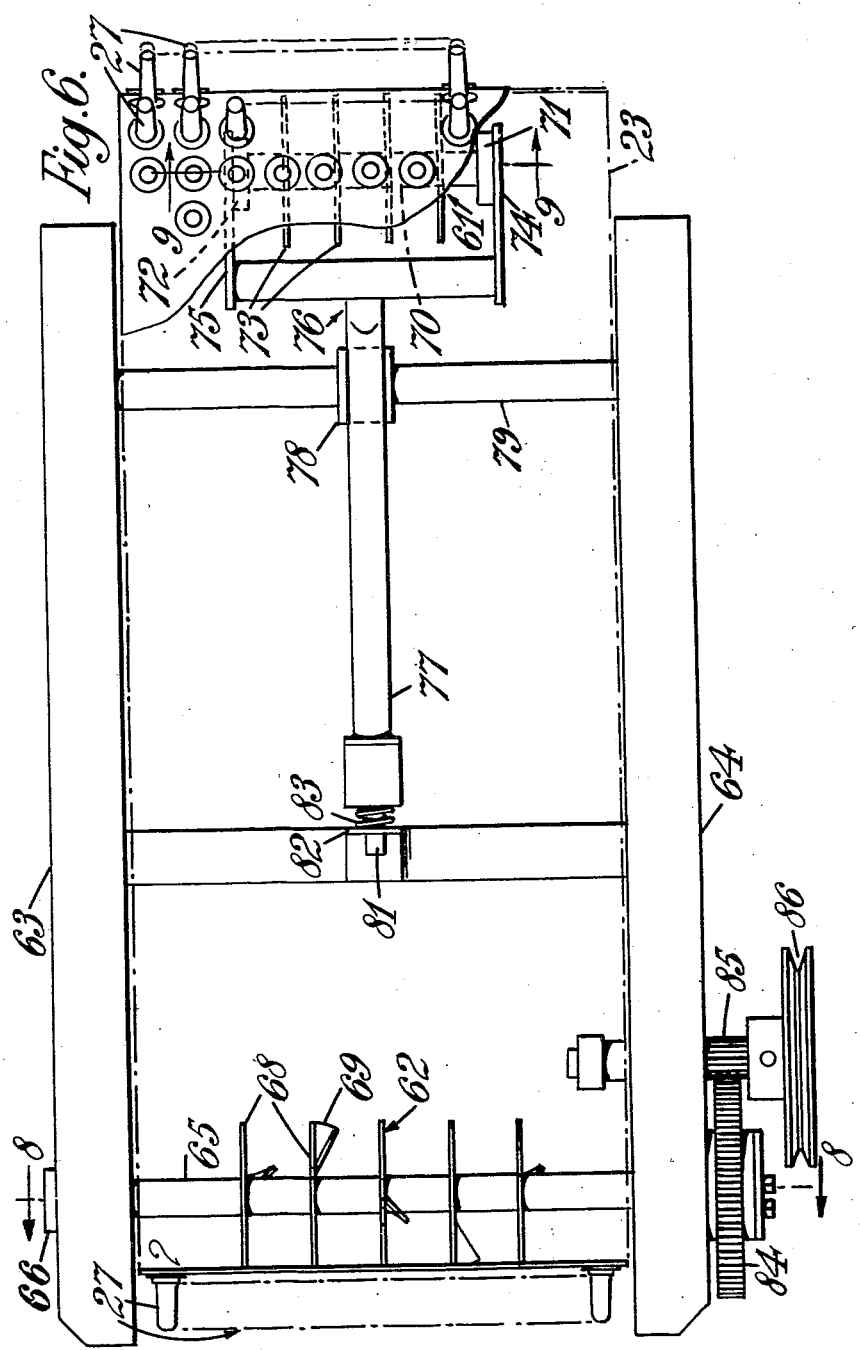

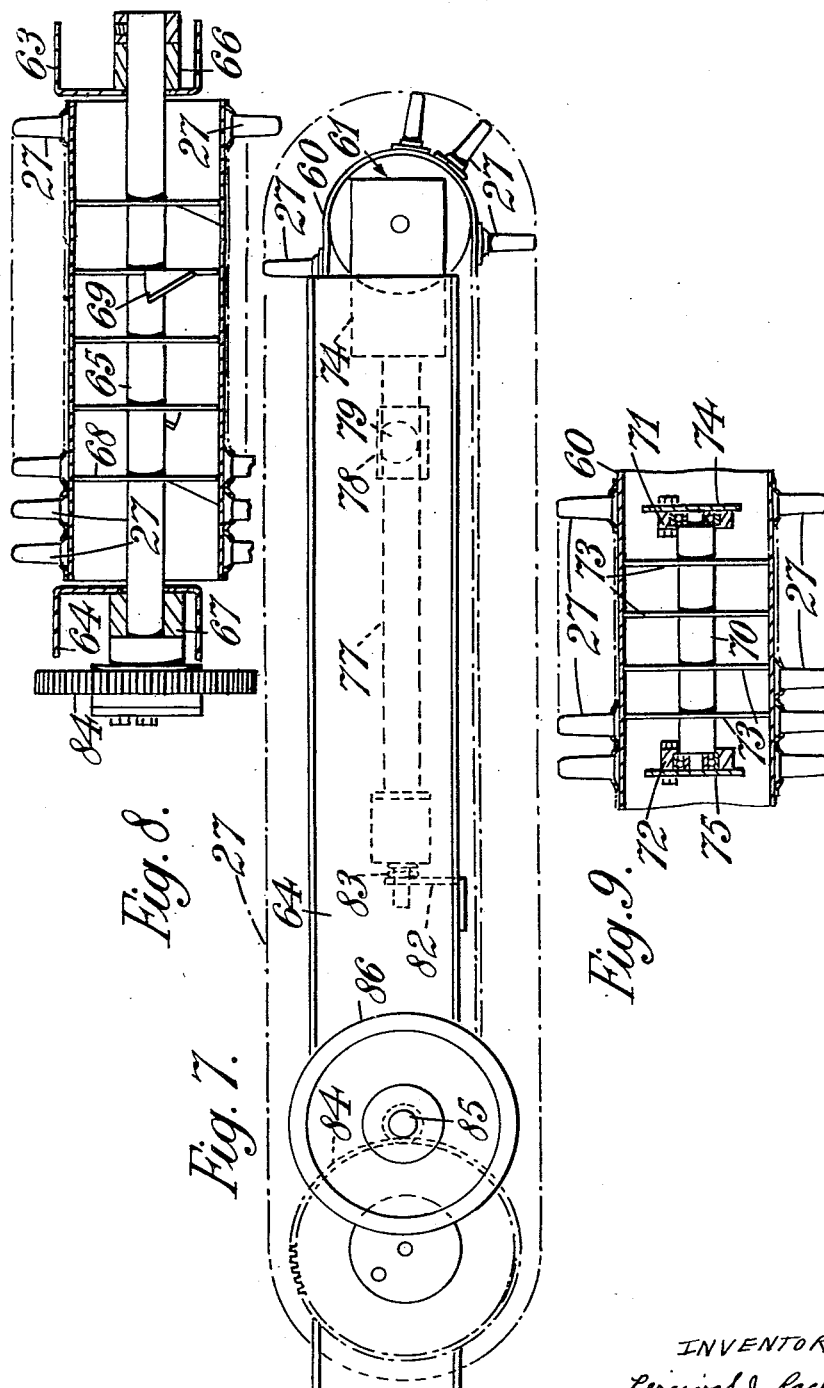

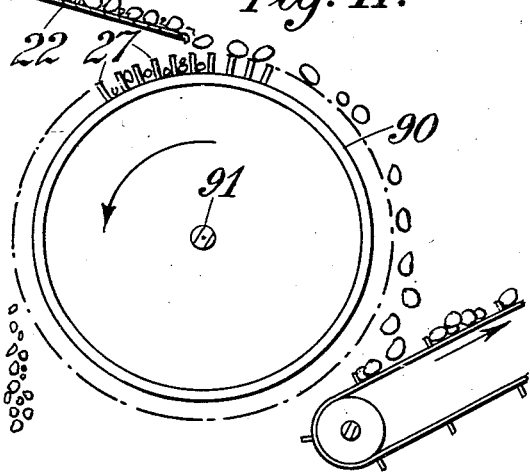
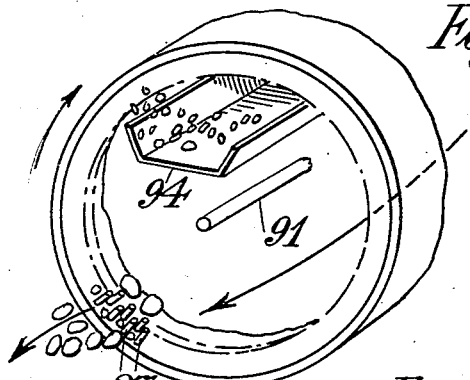
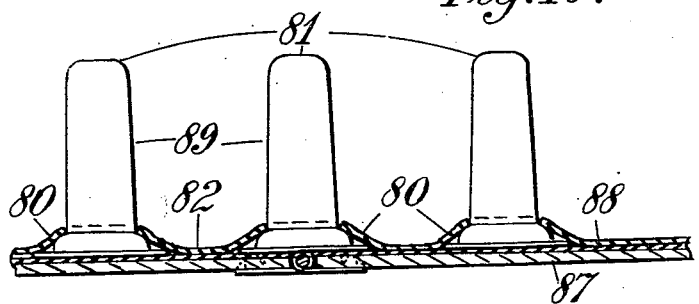

United States Patent Office 2,769,539
Patented Nov. 6, 1956

2,769,539

SEPARATING APPARATUS

Percival James Packman, Twyford, England, assignor to Packman Harvester Developments Limited, London, England, a British company Application November 17, 1952, Serial No. 320,869

Claims priority, application Great Britain November 20, 1951

5 Claims. (Cl. 209—78)

This invention relates to separating apparatus for the removal from potatoes and other root crops of foreign bodies raised with the crops during harvesting, in particular stones and clods. The term "separating apparatus" is intended to include sorting apparatus for grading root crops by size; the "foreign bodies" then being the smaller-sized elements in the crop.

The separation of large-sized stones and clods from the crops does not present great difficulty, because in general these materials form but a small proportion of the foreign bodies, and they can be readily removed by hand. It is the much larger mass of small and medium-sized foreign bodies that is most difficult to handle and remove economically. Another difficulty arising in removing such foreign bodies is that the large aggregate mass is made up of bodies that vary greatly in size, volume, specific gravity and shape. The potato-harvesting machine disclosed in Patent No. 2,488,983 can lift potatoes out of the ground at the rate of 400 lbs. a minute, and at times the volume of clods and stones is even greater than that of potatoes. When separation is effected as harvesting proceeds, the foreign bodies must be removed at the same high rate if the machine is to be operated at its full capacity.

The main object of the invention is to provide an improved separating apparatus for separating stones and clods raised with the crops.

The apparatus is of especial value as a fitting on a potato harvester machine for removing stones and clods raised with the potatoes as the machine moves over the ground.

Separating apparatus according to the present invention comprises a conveyor provided with a multiplicity of upstanding studs or fingers which are spaced apart by distances corresponding approximately to the maximum dimension of the foreign bodies to be removed from the crops, the studs or fingers being stiff enough to remain erect under the load of the material passed on to it for separation and having resilient tips and walls of rubber or rubber-like material, in combination with feeder means for projecting a stream of the harvested material to be separated on to the surface of the conveyor in such a manner that the stream meets that surface in a direction parallel to or substantially parallel to the surface, whereby separation is effected through the crops rolling over the surface to one discharge position whereas the foreign bodies drop into and become trapped in the gaps between the studs or fingers for travel with the conveyor to another discharge position.

The most satisfactory arrangement is that in which the feeder means is arranged to direct the stream on to the conveyor separator surface at an angle within the range of 0°–15° relatively to the plane of the conveyor surface.

The conveyor is in the form of an endless band; and the band is provided with a straight stretch to provide a separator length which is substantially horizontal longitudinally and is canted to the horizontal transversely of its length, and the feeder means projects the stream of material to be separated across the band from one side so that the crops roll over the separator surface down the cant to a discharge position at the other side of the band. The angle of cant is preferably adjustable; and the feeder means may incorporate a chute for projecting the stream of material onto the band.

The preferred studs or fingers are made wholly of rubber or rubber-like material such that they are capable of limited flexing as a whole while remaining erect under the load of the material to be separated. They may, however, be provided with stiff inserts which extend for substantially their full height and which have a covering of rubber or rubber-like material forming the walls and tips of the studs or fingers. In both forms the studs or fingers are preferably tapered towards their tips so as to afford tapering gaps between the studs or fingers. This formation assists the entry and trapping of the stones and clods.

An embodiment of the invention is illustrated by way of example in the accompanying drawings, in which:

Figure 3 is a back elevation of the machine, looking from the left of Figure 2;

Figure 4 is a diagrammatic end view of a conveyor band;

Figure 5 is a diagrammatic side elevation of another conveyor band;

Figure 6 is a fragmentary plan view, on an enlarged scale, of a separating apparatus incorporating a conveyor band;

Figure 7 is a side elevation of the conveyor shown in Figure 6;

Figure 8 is a transverse section on the line 8—8 of Figure 6;

Figure 9 is a transverse section on the line 9—9 of Figure 6;

Figure 10 is a longitudinal section of a portion of a conveyor band fitted with fingers; and Figures 11 and 12 are diagrammatic views of two further forms of separator apparatus.

Figure 1:
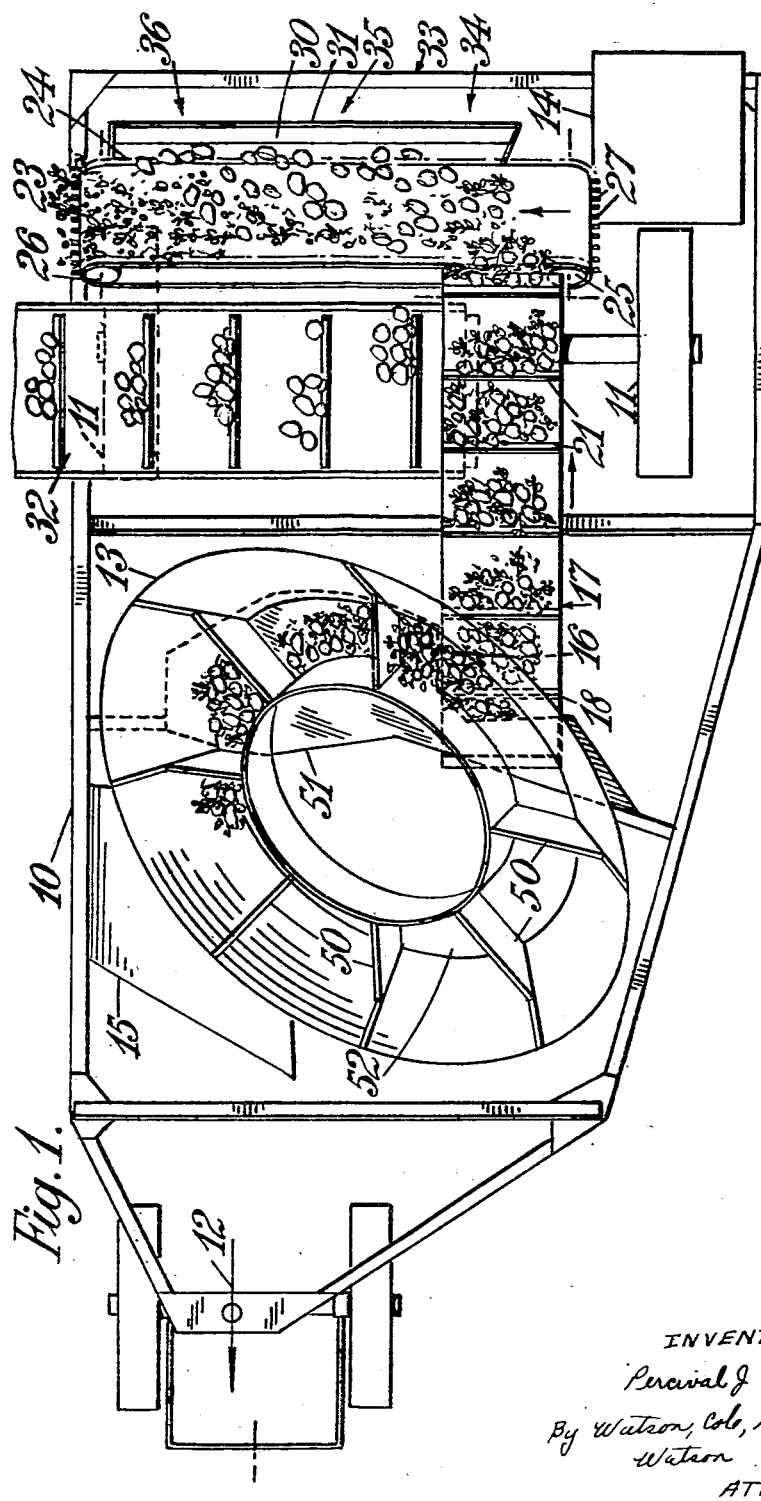
Figure 1 is a diagrammatic plan view of a potato harvester machine fitted with a separating apparatus according to the present invention.
Figure 2:
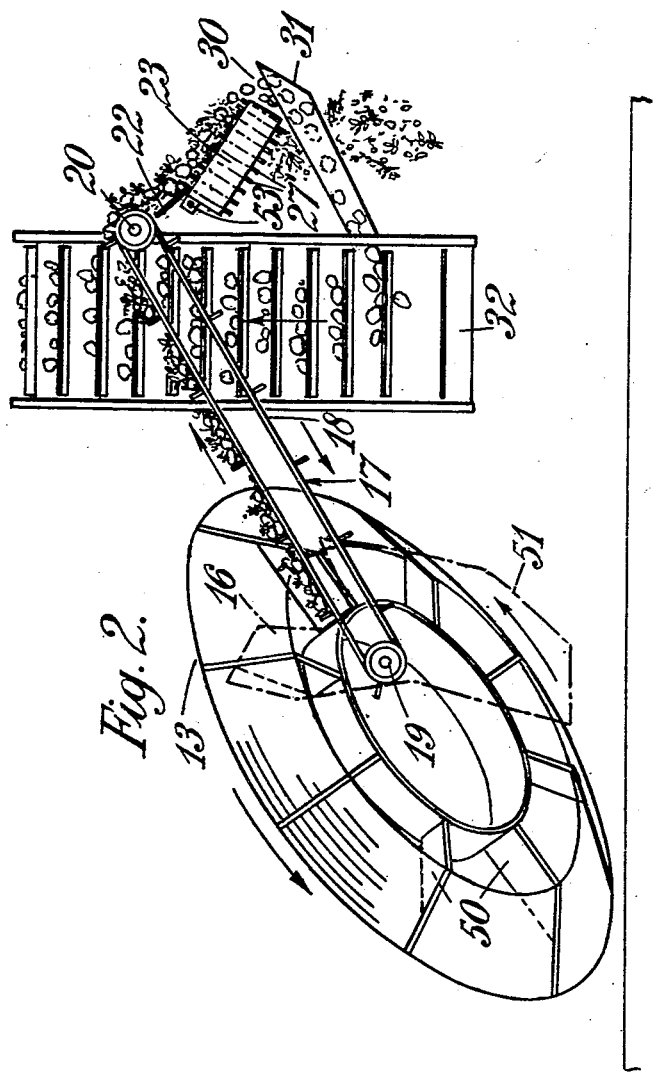
Figure 2 is a side elevation of the machine shown in Figure 1.

Referring first to the apparatus shown in Figures 1 to 3, there is shown diagrammatically at 10 a potato harvesting machine mounted on travelling wheels 11 and adapted to be drawn by tractor in the direction of the arrow 12. The machine is fitted with a riddle 13 of truncated conical form which is continuously rotated by an engine 14 mounted on the machine frame. The riddle shown is of the form disclosed in Patent Number 2,488,983. Potatoes and foreign material such as soil and stones are raised by a plough 15 and transferred into the bottom of the rotating riddle 13 as the machine advances over the ground. This material is carried by the riddle into into an elevated position. For this purpose the riddle is provided with radial fins 50 that form pockets for holding the material. During rotation of the riddle soil and stones are partially separated from the crops through the apertures in the riddling surface. At their elevated position the potatoes and remaining foreign materials are discharged by gravity through a clearance opening 16 in a fixed shield 51 extending behind an annular gap 52 at the narrow end of the riddle.

Under the opening 16 is located the lower end of an elevator 17. The elevator is in the form of an endless band 18 mounted on end rollers 19, 20 and fitted with lifter slats 21. The potatoes and foreign material discharged from the riddle fall on to the lower end of the elevator, and they are carried by the travelling band into an elevated position to the top of the elevator adjacent the roller 20. From its position the material drops on to ramp 22. This ramp serves as a feeder device for projecting the material on to a separating apparatus 23 in accordance with the present invention. The separating apparatus 23 incorporates an endless conveyor band 24 mounted on end rollers 25, 26. This band is caused to move continuously in the direction of the arrow by the engine 14 as the machine travels over the ground.

The upper stretch of the endless band 24, which provides the separator length, extends horizontally in a direction transverse to the machine, i. e. to the direction in which the machine travels. The band is also canted laterally, as shown in Figure 2. The pivots for the rollers 25, 26 are carried by a frame mounted for swivelling movement at 53 (Figure 2) so as to render the cant of the conveyor adjustable to any angle in the range of 10° to 30° from the horizontal.

The endless band 24 is fitted externally with a multiplicity of upstanding studs or fingers 27. The ramp 22 is so arranged, relatively to the separator length on the upper stretch of the band, as to cause the stream of the material discharged from the top end of the elevator to be projected on to the separator length in a direction parallel to or substantially parallel to that surface. Figure 4 illustrates a range of angles of projection for the stream, from a truly parallel position at 28 to an oblique position of about 15° at 29.

The manner in which separation is effected will be described later.

Behind the separator is the mouth 30 of a chute 31 for receiving potatoes separated from the stones and clods on the separator length of the endless band 24. The potatoes roll across the canted band on the tips of the studs or fingers and thence into the chute, whence they are discharged on to the bottom of a transverse elevator, 32. The potatoes carried to the top of this elevator are discharged into bags or otherwise collected. Stones and clods separated from the potatoes are carried by the conveyor band to the end of the conveyor adjacent to the roller 26, where they are automatically discharged by gravity on to the ground as the band turns round over the roller.

At the back of the separator 33 is a framework forming three stations 34, 35, 36 for operators following the machine to pick off large stones and clods and any other foreign material that is not removed by the separator surface from the potatoes.

In the modification shown diagrammatically in Figure 5, there is shown an endless travelling conveyor band 37 which is carried by end rollers 38, 39, arranged longitudinally on a slant to act as an elevator. The materials to be separated are fed by a ramp 40 transversely on to the separator surface on the top stretch of the conveyor band at its lower end. Potatoes passing on to the separator surface roll over that surface to the other side of the conveyor band, where they are discharged and collected in any suitable way. Stones and clods are carried up the conveyor band to its top, where they are discharged by gravity as the band passes over the top roller 38.

One suitable form of separating device is shown in Figures 6, 7, 8 and 9. There is provided an endless band 60 mounted on end rollers 61, 62. The assembly is fitted between rigid side members 63, 64 of channel section. The roller 62 is mounted on a shaft 65 fitted at its ends in bearings 66, 67. The roller is built up of a series of discs 68 fixed coaxially on the shaft. The use of such discs avoids the possibility of soil and other foreign matter becoming wedged between the inside surface of the band and the roller surface as would occur with plain cylindrical rollers. Lateral fins 69 are pressed out of the peripheral portions of the disc 68 to act as scrapers for removing foreign matter adhering to the inside surface of the band.

The roller 61 at the other end of the endless separator band extends centrally across the band for only a portion of its width. This roller incorporates a shaft 70 fitted in end bearings 71, 72. On the shaft are fixed coaxial discs 73 which afford the roller surface and correspond to the discs 68 on the other roller 62. The bearings 71, 72 for the roller shaft are fitted to the arms 74, 75 by a fork 76 having a stem 77 slidable in a guide 78 on a cross member 79. The free end of the stem has a peg 81 guided for sliding movement in a bracket 82 so as to render the fork capable of limited longitudinal movement. A compression spring 83 urges the fork longitudinally in order to exert a tension on the band. The shaft 65 is driven through gearing 84, 85 from a pulley 86.

The apparatus shown in Figures 6, 7 and 8 is suitable for application to the harvester machine in Figures 1, 2, and 3.

Figure 10 shows one form of band construction. The band incorporates a canvas layer 87 to the outer surface of which is bonded a layer of polyvinyl-chloride material 88. Studs or fingers 89, of rubber or rubber-like material, are formed with flanges 90 at their roots which rest upon the band. The fingers taper slightly towards their tips, which are flat-topped except for a chamfer 81. The fingers are located in spaced formation by polyvinyl sheet material 82, which is provided with clearance holes for the fingers, the rims of the holes overlying the flanges 80. The sheet layer 88 is bonded to the layer 82 to secure the fingers in position.

When the stream of materials to be separated is subjected over the separator surface afforded by the tips of the fingers, the potatoes will roll freely over the surface to the discharge position by reason of their lightness, roundness and resilience. The very small potatoes will for the most part drop into and become trapped in the gaps between the fingers. But even when the potatoes are of a size rendering them capable of entering a gap their rolling impetus will permit some of the larger ones to ride over the gaps. Stones and clods are normally of irregular shape, and when they pass on to the separator surface, their movement is arrested by projections striking the tips of the fingers. In this way they drop readily into the gaps between the fingers and become trapped therein. The fingers are stiff enough to remain erect under the load of the materials supported by them, so as to maintain the gaps open, and yet they are capable of limited resilient flexing, so as to absorb the shock of impact and also exert a gripping pressure on material trapped in the gaps. The rubber surface also acts as cushion for the potatoes or other root crops to prevent damage.

Large stones and clods too large to become trapped in the gaps will also become arrested, as they are not free to roll, and they will also become separated from the crops, travelling with the band in a direction away from the crops.

When the endless conveyor band passes over an end pulley, the fingers spread open, and so release the trapped stones and clods.

In the construction of Figure 11, the conveyor is in the form of a rotary drum 90 mounted on a horizontal shaft 91 and having its peripheral wall externally covered with radial studs or fingers 27. The stream of crops and foreign bodies is fed tangentially down a ramp 22 on top of the drum; the potatoes roll over the surface down one side of the drum (to the right), and the foreign bodies are carried between the studs of fingers to the other side of the drum (to the left), whence they are discharged. A conveyor 92 carries away the potatoes.

A modification of the last construction shown in Figure 12 incorporates a drum 90 provided with studs or fingers 27 extending radially inwards from the inside peripheral wall of the drum. The stream of material to be separated is fed into the bottom of the drum from one end. The root crops ride over the studs or fingers along the bottom of the drum, and are eventually discharged from the other end. The stones and clods which become lodged between the studs or fingers 27 are carried up the wall of the rotating drum, until they reach a position where they drop clear by gravity. A chute 94 carries away the foreign bodies for discharge from the drum.

I claim:

1. A separating apparatus for the removal from root crops of foreign bodies, such as stones and clods raised with the crops during harvesting, comprising in combination an endless band conveyor, a multiplicity of upstanding fingers on said endless band, which fingers are spaced apart by distances corresponding approximately to the maximum dimensions of foreign bodies to be removed from the crops, are stiff enough to remain erect under the load of mixed crops and foreign bodies passed on to said endless band for separation, and have resilient tips and walls of rubber or rubberlike material, support means to support said endless band so as to provide a separator length which is canted to the horizontal transversely of its length and is substantially horizontal in the direction of its length, feeder means a one side of and spaced from one end of said separator length through which a mixture of crops and foreign bodies can be fed onto said fingers in said separator length, crop discharge means at the other side of said separator length through which crops are discharged, and means to move said endless band longitudinally of itself so that its movement in its separator length is towards said one end thereof.

2. A separating apparatus according to claim 1 wherein said means to support said endless band is adjustable to vary the angle of cant to the horizontal of said separator length.

3. A separating apparatus according to claim 1 wherein said feeder means comprises a chute for projecting a mixture of root crops and foreign bodies onto said separator length.

4. A separating apparatus according to claim 3 wherein said chute is directed to discharge said stream transversely of said endless band.

5. A separating apparatus according to claim 1 wherein said support means comprises a support for said endless band at said one end of said separator length round which support said endless band passes so that said fingers project downward after passing round said support and the separated foreign bodies fall by gravity from said endless band.

References Cited in the file of this patent

UNITED STATES PATENTS

| | | |
|---|---|---|
| 1,141,852 | Sutton | June 1, 1915 |
| 1,559,915 | Royer | Nov. 3, 1925 |
| 1,986,925 | Finn | Jan. 8, 1935 |
| 2,015,549 | Dwyer et al. | Sept. 24, 1935 |
| 2,488,983 | Packman | Nov. 22, 1949 |
| 2,633,685 | Edwards | Apr. 7, 1953 |
| 2,643,754 | Doak | June 30, 1953 |
| 2,685,966 | Davenhauer | Aug. 10, 1954 |

FOREIGN PATENTS

| | | |
|---|---|---|
| 693,573 | Great Britain | July 1, 1953 |
| 948,000 | France | Jan. 24, 1949 |